United States Patent
Fleytman

(10) Patent No.: US 6,447,418 B1
(45) Date of Patent: Sep. 10, 2002

(54) VARIABLE RATIO RANGE SET FOR A TRANSFER CASE

(75) Inventor: Yakov Fleytman, Orion, MI (US)

(73) Assignee: New Venture Gear, Inc., Troy, MI (US)

( * ) Notice: Subject to any disclaimer, the term of this patent is extended or adjusted under 35 U.S.C. 154(b) by 29 days.

(21) Appl. No.: 09/685,790

(22) Filed: Oct. 10, 2000

Related U.S. Application Data

(60) Provisional application No. 60/159,887, filed on Oct. 15, 1999.

(51) Int. Cl.[7] .......................... F16H 3/72; B60K 17/344
(52) U.S. Cl. .............................................. 475/7; 74/425
(58) Field of Search ................ 475/5, 7, 204, 475/336, 339; 74/425, 665 G, 665 GE; 180/247

(56) References Cited

U.S. PATENT DOCUMENTS

| | | |
|---|---|---|
| 548,860 A | 10/1895 | Ames |
| 1,903,318 A | 4/1933 | Wildhaber |
| 1,980,237 A | 11/1934 | Trbojevich |
| 3,220,284 A | 11/1965 | Horvath |
| 3,535,948 A | 10/1970 | Winzeler |
| 3,597,990 A | 8/1971 | McCartin |
| 3,711,910 A | 1/1973 | Strejc |
| 3,875,635 A | 4/1975 | Pavlov et al. |
| 3,895,700 A | 7/1975 | Kerr |
| 3,977,632 A | 8/1976 | Walson |
| 4,047,449 A | 9/1977 | Popov |
| 4,489,625 A | 12/1984 | White |
| 4,632,337 A | 12/1986 | Moore |
| 4,685,346 A | 8/1987 | Brackett |
| 4,697,476 A | 10/1987 | Maxwell |
| 4,783,023 A | 11/1988 | Jupe |
| 4,907,672 A | 3/1990 | Muzzarelli |
| 4,973,295 A | 11/1990 | Lee |
| 4,998,385 A | 3/1991 | Umezono et al. |
| 5,015,898 A | 5/1991 | Frey |
| 5,018,403 A | 5/1991 | Umezono et al. |
| 5,033,996 A | 7/1991 | Frey |
| 5,081,885 A | 1/1992 | Shaffer |
| 5,265,488 A | 11/1993 | Yang |
| 5,353,889 A | 10/1994 | Hamada |
| 5,609,219 A * | 3/1997 | Watson et al. ............... 180/197 |
| 5,647,790 A | 7/1997 | Horiutchi |
| 5,720,688 A * | 2/1998 | Wilson et al. ............... 180/247 |
| 5,836,847 A * | 11/1998 | Pritchard ..................... 180/247 |
| 5,988,006 A | 11/1999 | Fleytman |
| 5,992,259 A | 11/1999 | Fleytman |
| 6,074,322 A | 6/2000 | Fleytman |
| 6,093,126 A | 7/2000 | Fleytman |
| 6,098,480 A | 8/2000 | Fleytman |
| 6,148,683 A | 11/2000 | Fleytman |

FOREIGN PATENT DOCUMENTS

| | | |
|---|---|---|
| DE | 2415859 | 10/1975 |
| DE | 3435219 A1 | 5/1985 |
| DE | 3428865 C1 | 9/1985 |
| FR | 2341787 A1 * | 9/1977 |

* cited by examiner

Primary Examiner—Richard M. Lorence
Assistant Examiner—Ankur Parekh
(74) Attorney, Agent, or Firm—Harness, Dickey & Pierce P.L.C.

(57) ABSTRACT

A range shift arrangement is disclosed for shifting a gear reduction unit between a low-range operating speed and a high-range operating speed, or any speed range in-between. This arrangement is particularly adapted for use in vehicle power transfer devices, such as four-wheel drive transfer cases, for allowing the operator to shift "on-the-move:" between a low-range drive mode and a high-range drive mode, or any range therebetween. In the preferred embodiment, the gear reduction unit includes a first component driven by the input shaft, a second component driving the output shaft, and a third component driven by a worm gearset. The worm gearset includes a worm gear fixed to the third component and a worm meshed with the worm gear. A variable speed motor is operable to drive the worm so as to vary the rotary speed of the third component, thereby varying the speed ratio between the input and output shafts.

22 Claims, 15 Drawing Sheets

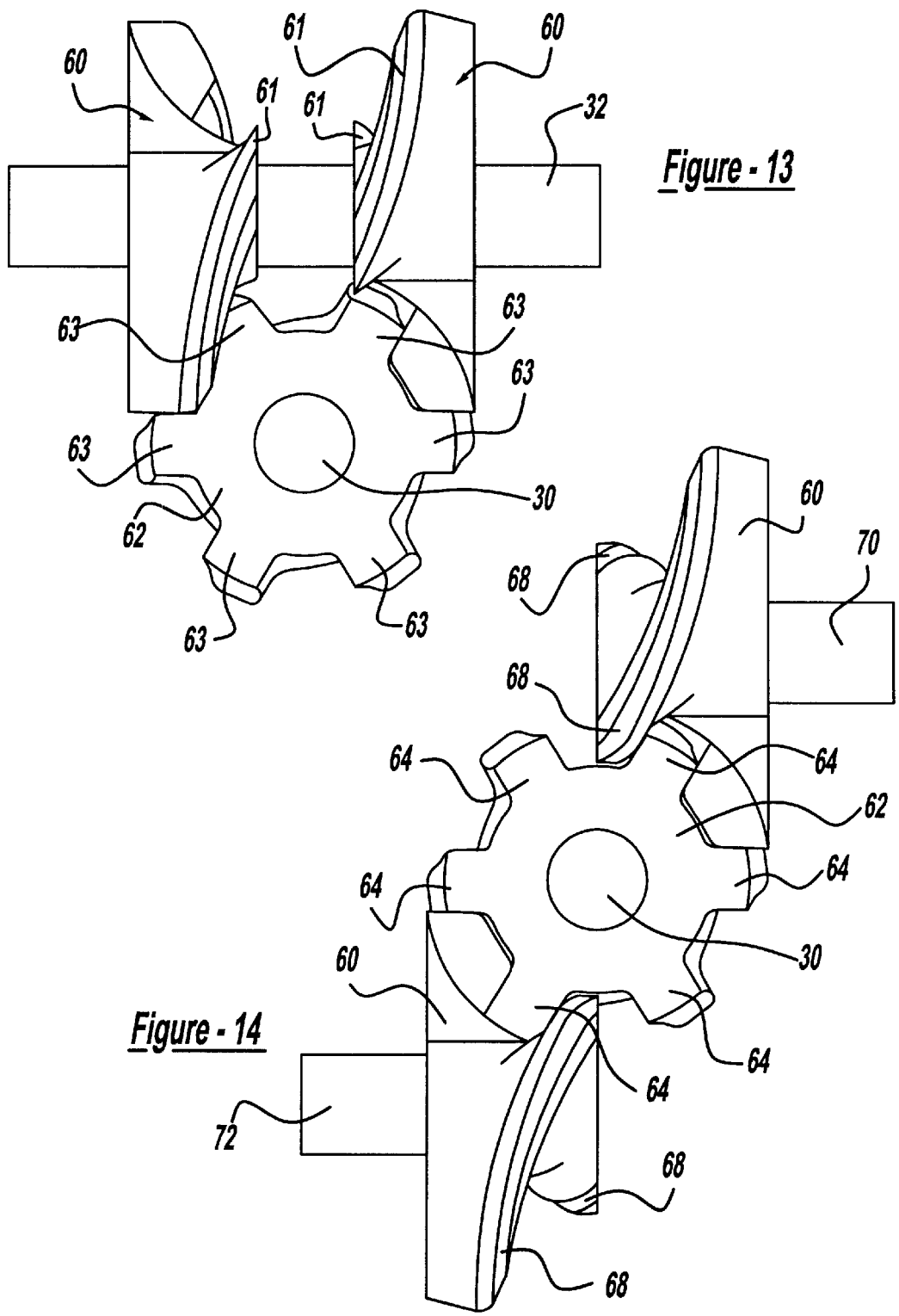

VARIABLE RATIO RANGE SET FOR A TRANSFER CASE

This application claims the benefit of provisional application Serial No. 60/159,887 filed Oct. 15, 1999.

FIELD OF THE INVENTION

The present invention relates generally to transfer cases for use in four-wheel drive vehicles and, more particularly, to a variable ratio range gearset for transfer cases.

BACKGROUND OF THE INVENTION

In general, power transfer mechanisms, such as transfer cases, are operatively associated with both manual and automatic transmissions for directing power to the non-driven wheels of a motor vehicle for establishing a four-wheel drive mode.

Many automotive transfer cases are equipped with a speed reduction gear assembly or the like for providing "high: and "low" speed ranges in conjunction with the two-wheel drive and four-wheel drive operating modes. As such, a range shift mechanism is typically provided for operatively shifting components of the speed reduction gear assembly between a high-range position and a low-range position. One example of a transfer case incorporating a speed reduction gear assembly is shown in U.S. Pat. No. 5,346,442 wherein a synchronized range shift arrangement allows "on-the-move" shifting from a low-range operating mode to a high-range operating mode while the vehicle is in the four-wheel drive mode. While such a synchronized range shift system has proven to be an improvement over traditional four-wheel drive transfer cases which required the stopping of the vehicle to shift from high-range to low-range while in the four-wheel drive mode, the teaching however still provides a bifurcated speed range arrangement.

As such, the need exists for the development of a range control system for use with gear reduction units which can establish variable torque reduction ratios between high and low limits.

SUMMARY OF THE INVENTION

In view of the foregoing, it is an object of the present invention to provide a range shift system for a gear reduction unit which can continuously vary the reduction ratios between high and low operating levels.

It is another object of the present invention to incorporate the variable range shift system and gear reduction unit into transfer cases for use in four-wheel drive vehicles.

As a related object, the variable range shift system can be arranged to permit the vehicle operator to select between distinct high and low speed ranges or operate in an adaptive mode where the speed range is automatically varied between the high and low range operating modes in response to vehicular operating and/or road conditions to improve the vehicle's tractive performance.

Accordingly, the variable range shift system of the present invention includes a mechanism for selectively rotating a component of the gear reduction unit to vary the torque transferred from the input shaft to the output shaft. More particularly, the range shift system includes a drive mechanism including a unique worm/worm gear transmission which is operatively coupled to a carrier member of the gear reduction unit. When the drive mechanism is held fixed, the carrier does not rotate and there is no reduction between the input and output shafts. However, when the drive mechanism is rotated, the carrier is rotated relative to the input shaft which functions to change the torque transferred to the output shaft. By varying the relative rotational velocity of the carrier member, it is possible to vary the torque transfer ratio of the transfer case.

Preferably, the drive mechanism includes a variable speed motor having an output arranged to drive the worm/worm gear transmission so as to control rotation of the carrier associated with a planetary gear reduction unit. A control system is provided to control actuation of the motor in response to operating characteristics of the vehicle.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 13 shows a worm/worm gear transmission with two modified worms aligned on the same axis of rotation and connected to a common shaft;

FIG. 14 shows a worm/worm gear transmission with two modified worms located on different axes of rotation;

DETAILED DESCRIPTION OF THE PREFERRED EMBODIMENTS

Figure 1:
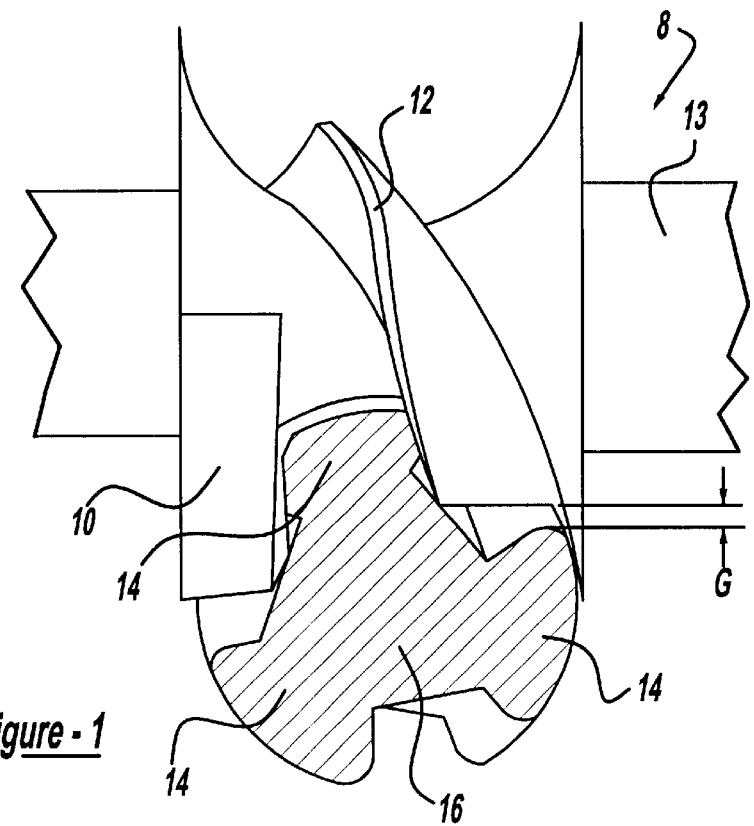
FIG. 1 is a sectional view of a worm/worm gear transmission with the worm gear having three teeth according to the principles of the present invention.
Figure 2:
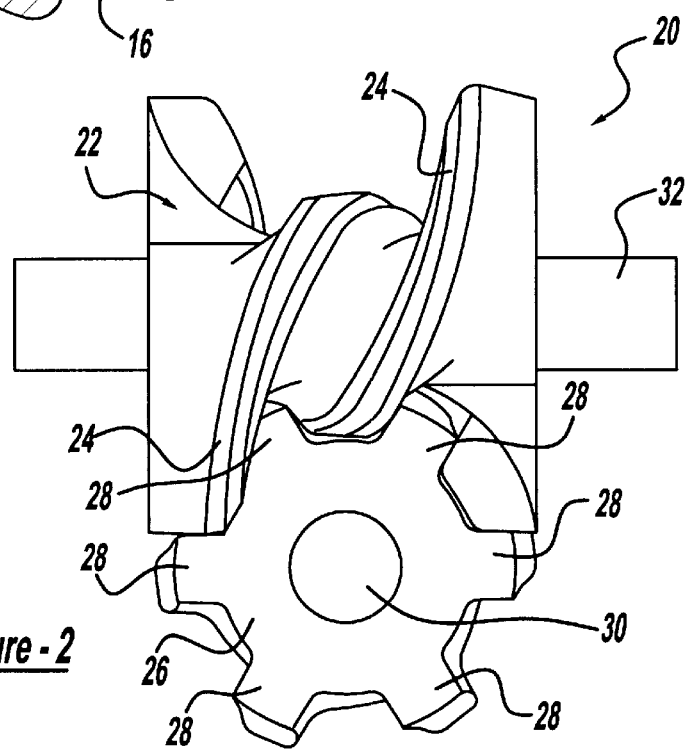
FIGS. 2 and 3 are views of a worm/worm gear transmission with the worm gear having six teeth according to the principles of the present invention.

In general, the present invention relates to a variable range shift system that is operable for shifting of a gear reduction unit, and which is capable of functioning at any point in the continuum of torque levels between a low-torque operating state and a high-torque operating state. Thus, the present invention is adapted for use in virtually any transfer case of a four-wheel drive vehicle for permitting selective shifting or automatic variable control between a low-range drive mode and a high-range drive mode and at any point in the range therebetween. The variable range system for use in transfer cases according to the principles of the present invention will be described below with reference to FIGS. 24 through 26. However, the following discussion relating to FIGS. 1–23 provides a detailed description and several examples of the unique enveloping-type worm/worm gear transmissions which can be utilized with the variable range system of the present invention.

The reason for using an enveloping-type worm gear is that this type of worm gear has a natural profile of tooth surface which is distinct from other types of thread followers. The configuration of the worm gear teeth is generated by the profile of the thread or threads of the worm. A computer model simulation is utilized to generated the configuration of the worm gear teeth of the worm gear. The worm gear is then formed using known techniques such as hobbing or casting. When the worm gear teeth are generated by the profile of the threads of the worm having different lengths for the same enveloping angle (shortened), the profiles of the worm teeth is different. The main advantage for using the enveloping-type worm gears is more torque capacity.

The worm thread has a rolling action contract relationship with the teeth of the worm gear which provides an increased efficiency. Furthermore, it is beneficial to have the pitch diameter in the center of the worm gear. With standard worm designs, with more than one thread and a large enveloping angle, the inability to assemble the worm and worm gear was considered a major obstacle. With the worm and worm gear of the present invention, the worm and worm gear are easily assembled by properly orienting the worm thread and worm teeth.

According to the present invention, the greater enveloping angle for one revolution of the worm thread permits the use of worm gear teeth without undercut portions. Enveloping worm/worm gear transmissions with a worm gear having less than twenty-four teeth have not been commercially used because it was believed impossible to build such a transmission due to the need to undercut the root of the worm gear tooth. Thus, those skilled in the art did not consider enveloping type worm gears with less than twenty-four teeth to be feasible for commercial applications. In contrast, the enveloping worm/worm gear transmission of the present invention utilize a worm gear without undercut gear teeth because of a greater enveloping angle for one revolution of the worm thread.

With less than twenty-four gear teeth and a greater enveloping angle for one revolution of the thread, as compared to prior enveloping worm/worm gear transmissions, the minimum ratio for one thread could be reduced to two, with an increase in achieved efficiency, in contrast, prior enveloping worm/worm gear transmissions had a minimum ratio of twenty-four for one thread of the worm and a ratio of five for five threads of the worm. The efficiency of the new worm/worm gear transmission is even greater than that of well-known hypoid gearsets which are used in low ratio right-angle drives. Thus, the present invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing.

In this application, it is possible to have "surface to surface" contact between the worm gear teeth and the worm thread, thereby increasing the torque capacity of the enveloping worm/worm gear transmission. This became feasible when the enveloping angle for one revolution of worm thread is equal or greater than 15 degrees. In all standard enveloping worm/worm gear transmissions, only "line" contact is obtained between the thread and worm gear teeth or thread followers. This physical distinction has realized new and unexpected results with regard to the torque capacity of the worm/worm gear transmission of the present invention. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gear set.

In accordance with one feature of the present invention, a worm/worm gear transmission is utilized to transmit rotation with the smallest ratio between the worm gear teeth and one worm thread. In the past, it has been believed that at least 24 teeth were required for a worm gear to be used with a double enveloping worm/worm gear combination. However, in the present invention, the big difference from the traditional worm/worm gear is not only in the number of teeth, but also in the enveloping angle of the worm thread, which is used for generation of the profile for the worm gear teeth. This enveloping angle can be as large as 180 degrees for one revolution of the thread when the number of worm gear teeth is only two but is preferably larger than 15 degrees. Further detail of the use of the unique worm/worm gear transmission discussed herein can be found in U.S. Pat. No. 5,992,259 entitled "Worm/Worm Gear Transmission and Apparatus for Transmitting Rotation Utilizing An Oscillating Input" and U.S. application Ser. No. 09/290,911 filed Apr. 12, 1999 titled "Worm/Worm Gear Transmission," both of which are owned by the inventor hereof and which are also expressly incorporated by reference hereto.

In the past, the worm and worm gears have been formed of materials having low coefficients of friction; worm gears typically were made only from bronze. With the present invention however, the worm and worm gear can be made from a high strength material, such as steel. The preferable shape of the teeth and threads for the worm gear and the worm are shown in the drawings, but could be different. Even so, a worker of ordinary skill in the art would recognize that other shapes would come within the scope of this invention.

Referring now to the drawings, one embodiment of a worm/worm gear transmission 8 of the present invention is illustrated in FIG. 1. Transmission 8 has an enveloping type worm 10 with at lease one screw thread 12. Enveloping type worm 10 is supported on a shaft 13. Thread 12 is engaged by at least one tooth 14 of an enveloping type worm gear 16, which is shown to have three teeth 14. As shown in FIG. 1, enveloping worm 10 has single thread 12 and worm gear 16 has three teeth 14 spaced about its circumference. As is also show, a gap "G" exists between any tooth on worm gear 16 and thread 12 on enveloping worm 10. Enveloping worm 10 wraps around enveloping worm gear 16, and enveloping worm gear 16 also wraps around enveloping worm 10. Worm gear 16 and worm 10 are preferably enclosed in a housing (not shown) in FIG. 1. Typically, the housing is made from metal and forms a reservoir for a lubricant to both lubricate and cool the gears, bearings, and seals for the unit. The housing forms a rigid support to mount the gears, bearings, seals and their associated parts (not shown).

Figure 17:
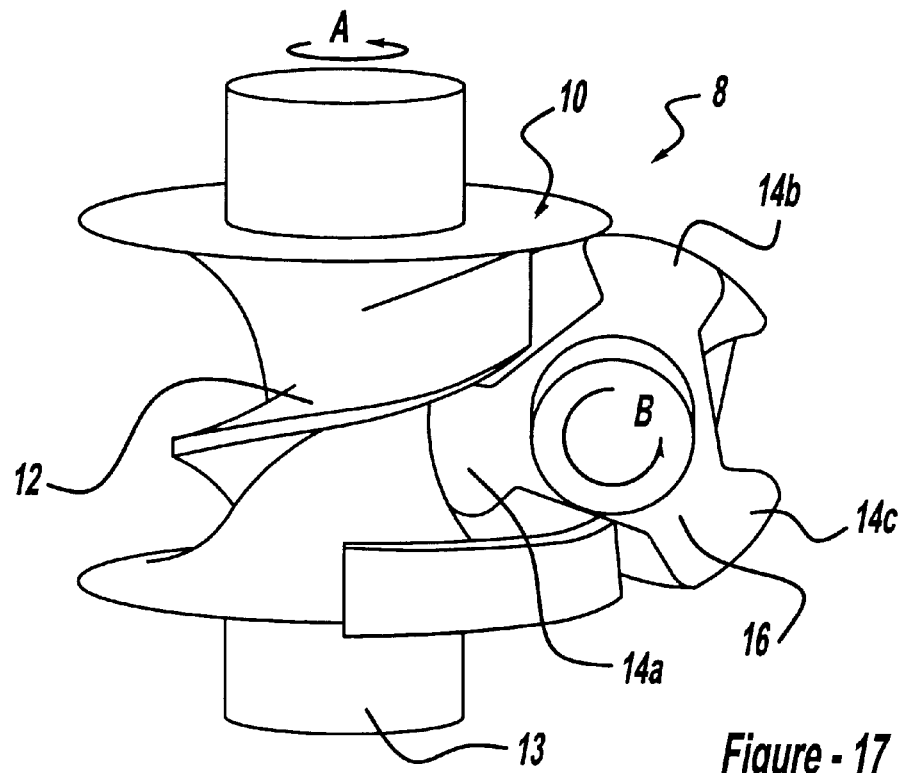
FIG. 17 is a perspective view of the worm/worm gear transmission shown in FIG. 1 with three worm gear teeth.

FIG. 17 is a perspective view corresponding with worm/worm gear transmission 8 shown in FIG. 1 and which includes an enveloping worm 10 having a single thread 12 and a worm gear 16 having three gear teeth 14. As can be understood, as worm 10 rotates in the direction of Arrow A, thread 12 which is engaged with tooth 14a presses downward on tooth 14a to cause rotation of worm gear 16 in the direction of Arrow "B." As worm gear 16 rotates, gear tooth 14b then comes into engagement with thread 12 and is acted on to cause further rotation of worm gear 16 as gear tooth 14a disengages from thread 12.

Figure 3:
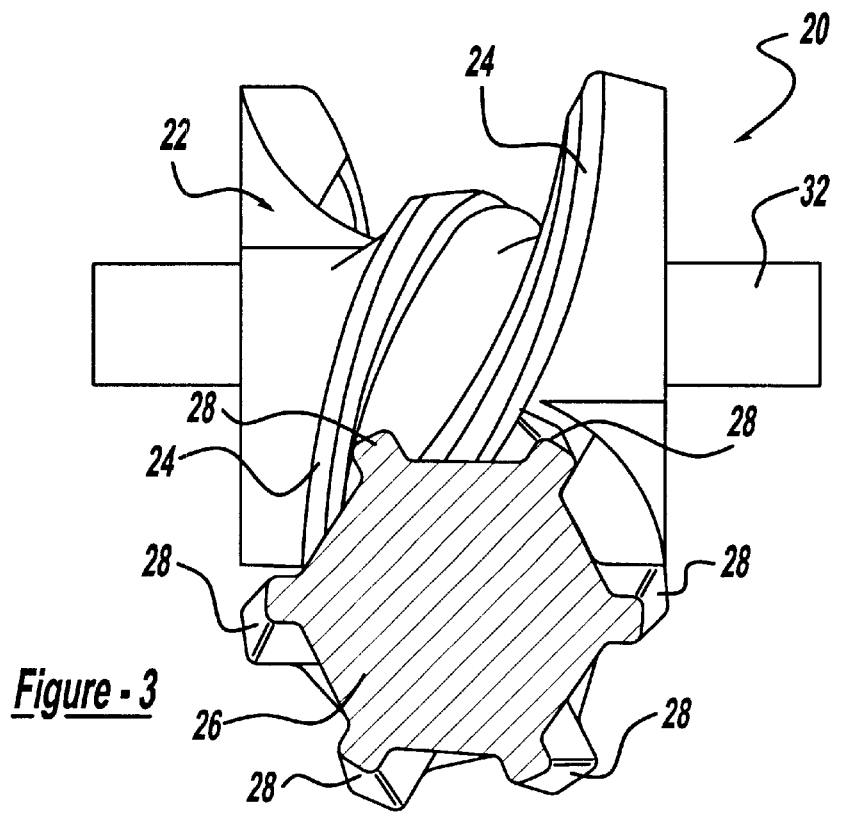
Figure 4:
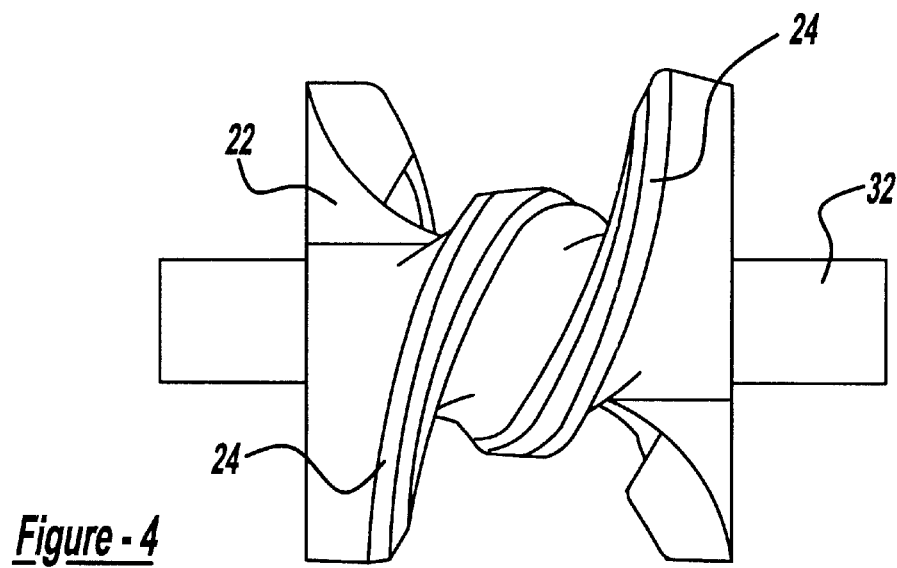
FIG. 4 is a side view of an enveloping worm having two threads.
Figure 18:
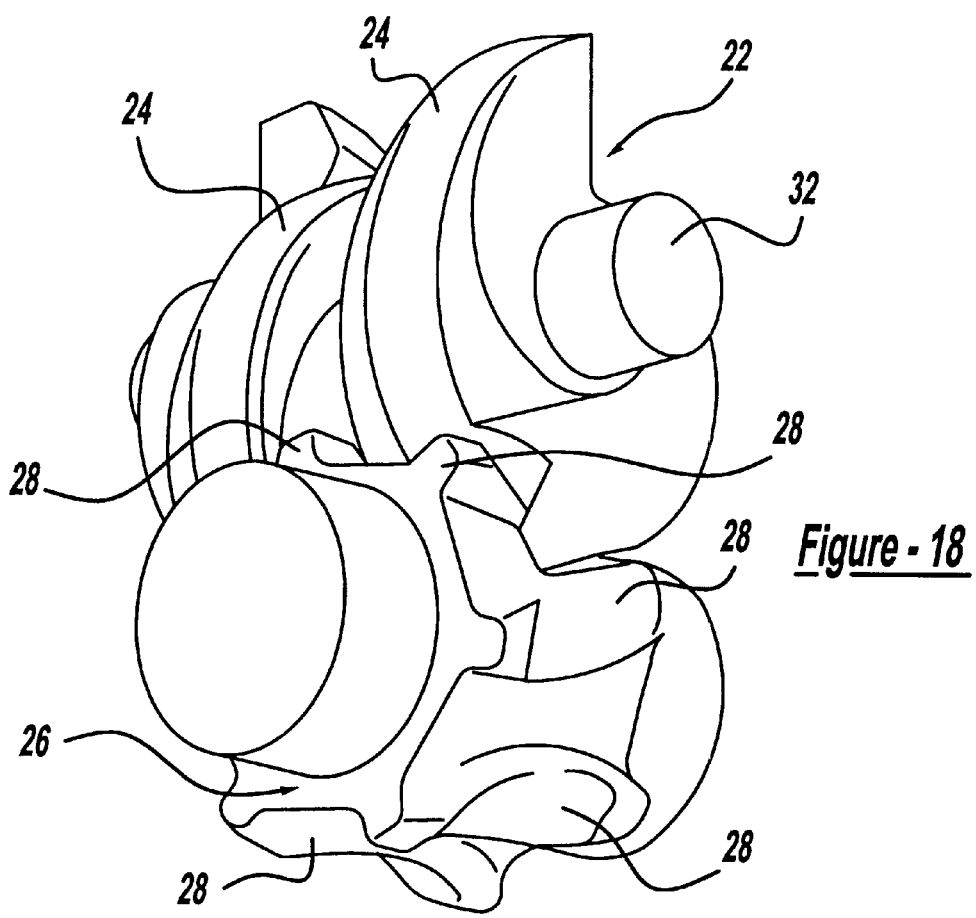
FIG. 18 is a perspective view of the worm/worm gear transmission shown in FIG. 2 with six worm gear teeth and two threads on the worm.

Another embodiment of a worm/worm gear transmission 20 of the present invention is illustrated in FIG. 1. This transmission has an enveloping-type worm 22 with two identical screw threads 24. Threads 24 are each engaged by at lease one tooth of an enveloping-type worm gear 26 shown to have six teeth 28. Worm gear 26 is connected to a shaft 30 while worm 22 is connected to a shaft 32. In FIG. 3, worm gear 26 is shown in cross-section. FIG. 4 is a side view of enveloping worm 22 with two identical threads 24 and supporting shaft 32. FIG. 18 is a perspective view corresponding with worm/worm gear transmission 20 shown in FIG. 2 and which includes enveloping worm gear 26 having six teeth 28 in mesh with enveloping worm 22 having two threads 24.

Figure 5:
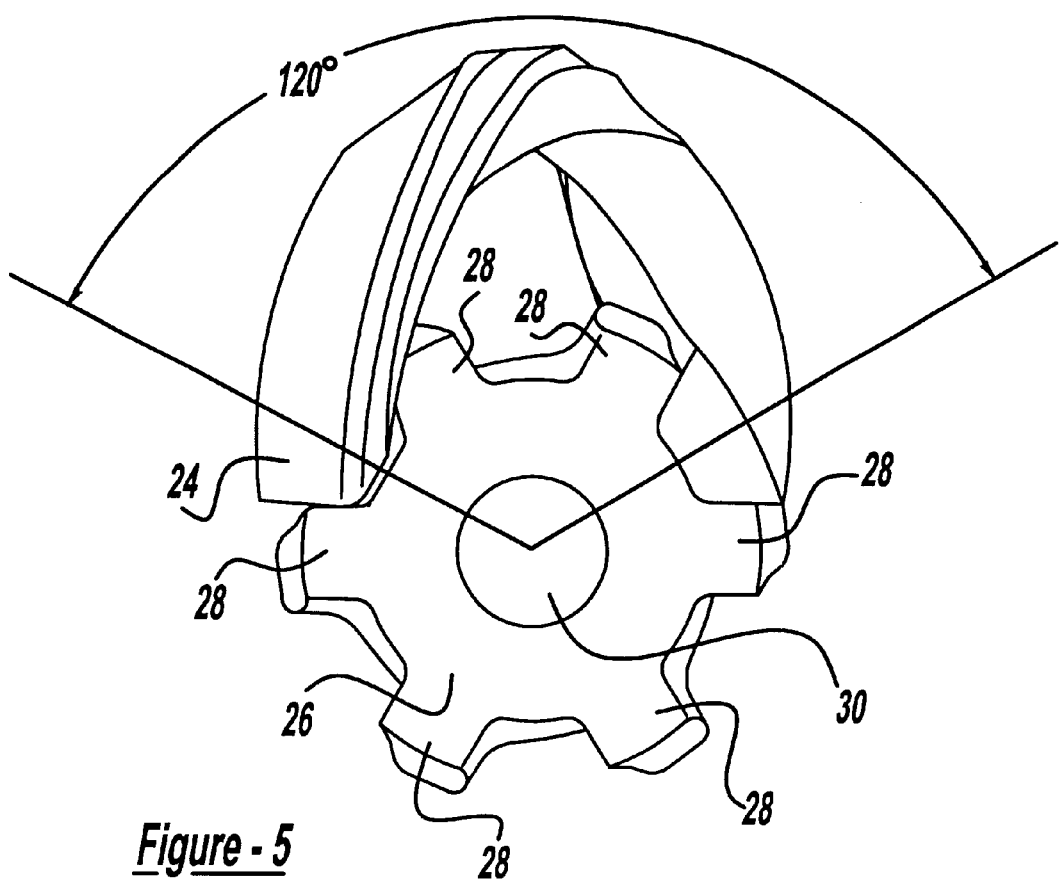
FIG. 5 illustrates an enveloping thread of a worm used for generating the gear teeth profile of the worm gear.

FIG. 5 shows an enveloping angle of 120° for enveloping worm thread 24 that is used to generate the six teeth 28 on worm gear 26. This enveloping worm thread 24 has one revolution of thread or 360° of revolution around its axis of rotation. For illustration of one revolution for the enveloping worm thread, we could use this example: the ends of worm threads have the same cross-sections but could be placed from one position to another position, which is a distinct 120°. This is possible by movement of the cross-section of the worm from one end along the worm thread 24 to another end. In this case, the cross-section will rotate 360° around the axis of rotation for shaft 32.

Figure 21:
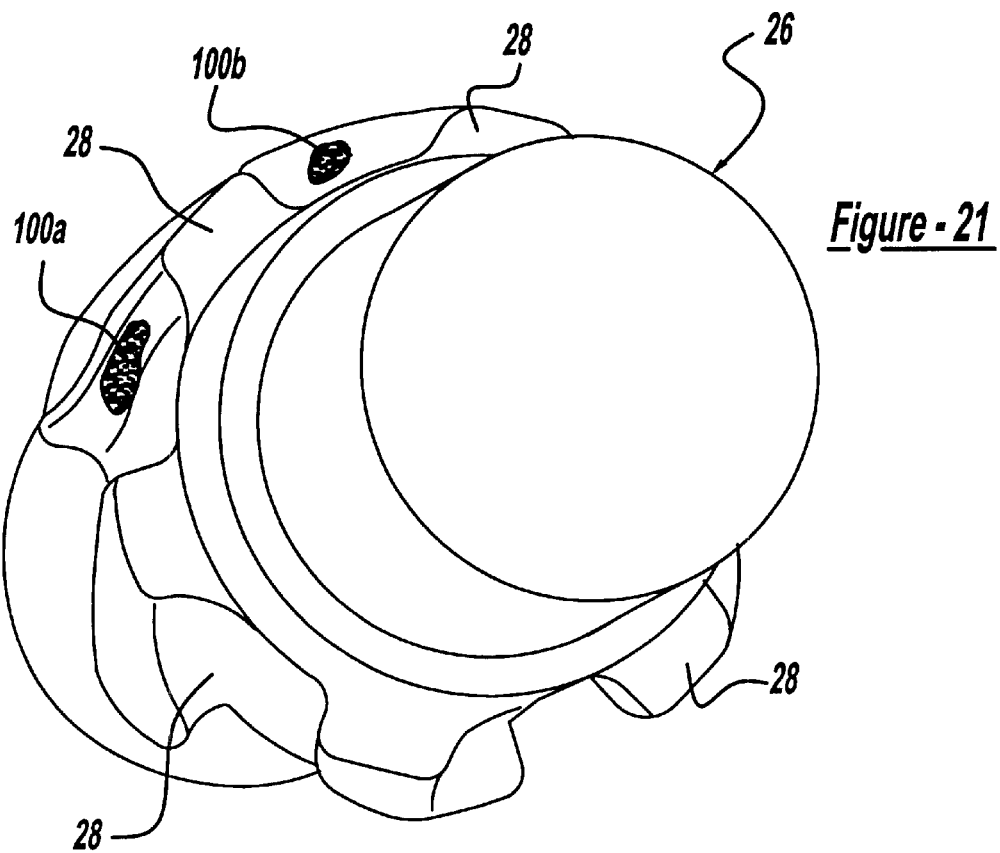
FIG. 21 is a perspective view of a worm gear with six teeth with darkened spots illustrated on the surface of the teeth to indicate the contact surface with the worm in mesh.
Figure 22:
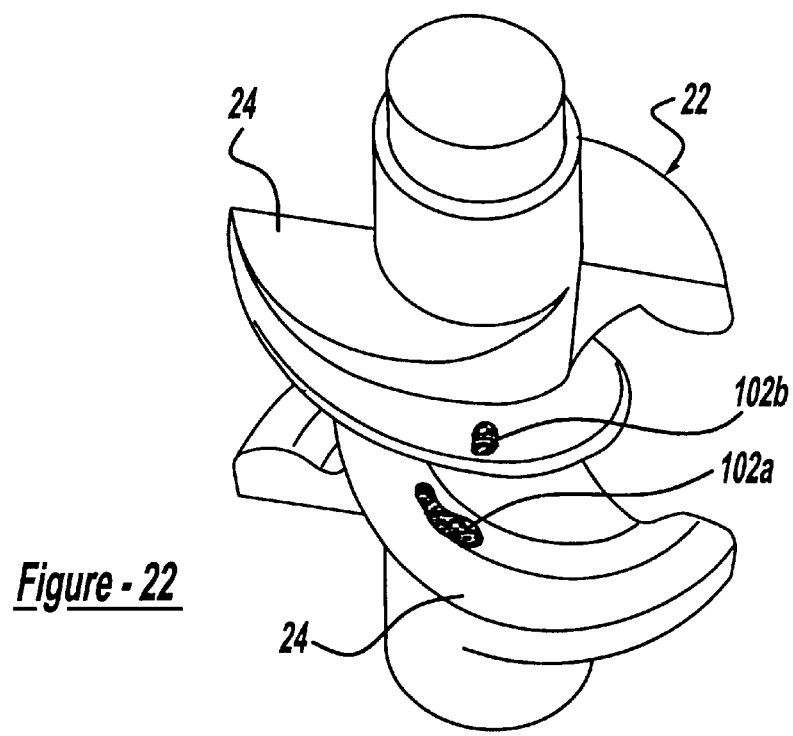
FIG. 22 is a perspective view of a worm with two threads with darkened spots illustrated on the surface of the thread to indicate the contact surface with the worm gear in mesh.

The enveloping worm/worm gear transmissions of the present invention provide for a worm gear having fewer than twenty-four teeth and also provides surface contact between the thread of the worm and the teeth of the worm gear as illustrated in FIGS. 21 and 22. FIG. 21 illustrates two surface contact spots 100a, 100b for a worm gear 26 having six teeth 28. FIG. 22 illustrates two corresponding surface contact spots 102a, 102a for a worm 22 with two threads 24.

Figure 6:
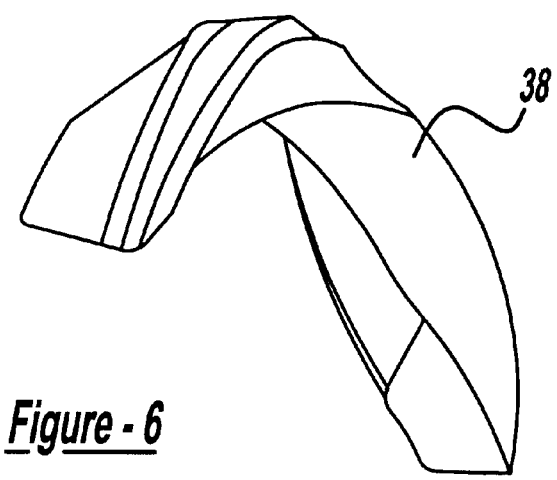
FIG. 6 is a view of a shortened thread of a worm used for generating the gear teeth profile of the worm gear.

FIG. 6 shows a worm thread 38 used for generating worm gear teeth and which is a shortened portion of a thread having an enveloping angle of 120°.

Figure 7:
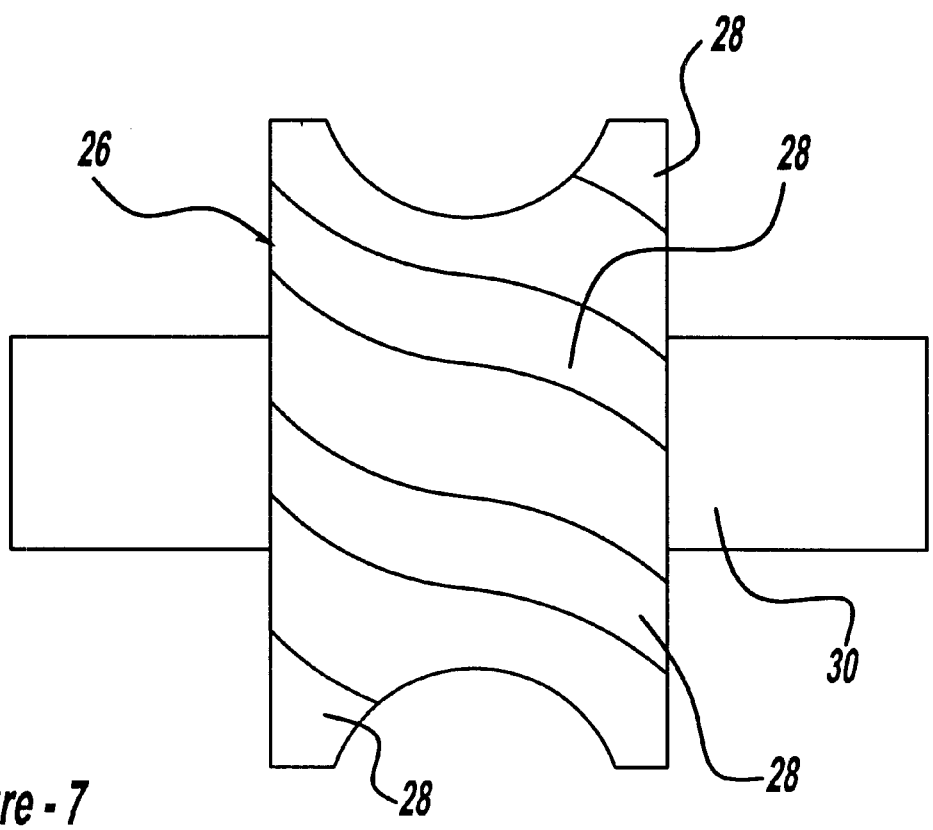
FIG. 7 shows an enveloping worm gear according to the principles of the present invention.
Figure 8:
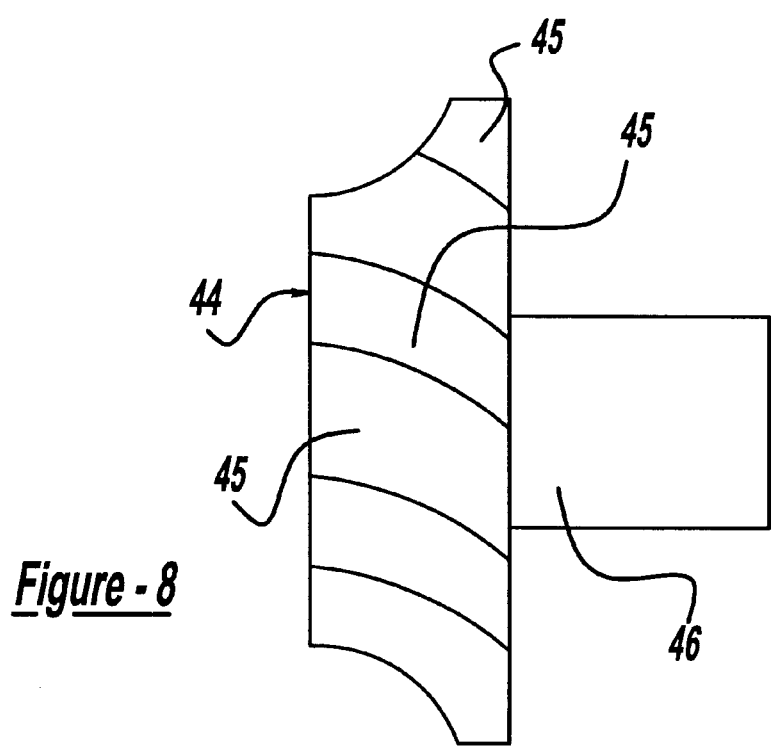
FIG. 8 shows a modified enveloping worm gear.

FIG. 7 shows a side view of enveloping worm gear 26 with six teeth 28. FIG. 8 shows an enveloping worm gear 44 having six teeth 34 which is modified from worm gear 26 shown in FIG. 7 by shortening the gear along its axis of rotation around a shaft 46. Practically, worm gear 44 could be longitudinally split into two halves and using only one shortened part or generated worm gear from blank, which is already shortened. Modified worm gear 44 is easy to assemble in a single reduction unit. This is very important for gears with a small pressure angle when it is difficult to assemble an enveloping worm with an enveloping type of worm gear. For many applications, only the modified worm gear 44 may be adequate. Enveloping worm gear 44 could connect to drive shaft 46 for supporting worm gear 44 from only one side or could be supported on both sides.

The bodies of enveloping worm gears 26 and 44 have axially extending end flanges that hook underneath flanges of adjacent collars to hold the worms in place. One or both of the worm and worm gear bodies are keyed or otherwise fastened to the shaft for driving or being driven. Relatively slight longitudinal movement of one or both the worm or worm gear allows for disassembling the entire worm gear—collars—shaft assembly.

In the present invention, it is preferred that the ratio of the number of teeth 14 on worm gear 16 relative to the number of threads 12 on worm 10 is 11 to 1 and less. Most preferably, the ratio is three or even less, as shown. It is possible that only two teeth 14 need to be utilized on worm gear 16. The worm/worm gear transmission used in the present application could also include a self-lock feature. The term "self-locking" as it is utilized in this application to describe the inventive worm and worm gear combinations, means that the teeth of the worm gear, when in contact with the thread of the worm, are not capable of rotating the worm about the axis of the worm. For example, teeth 14 do not slip on thread 12, thereby causing thread 12 to rotate about its own axis. By carefully selecting the material of teeth 14 and threads 12, and the respective angles, a worker of ordinary skill in the art would be able to achieve this goal. The worm/worm gear transmission of the present invention particularly lends itself to a geometric as opposed to a purely frictional type self-locking device.

Figure 9:
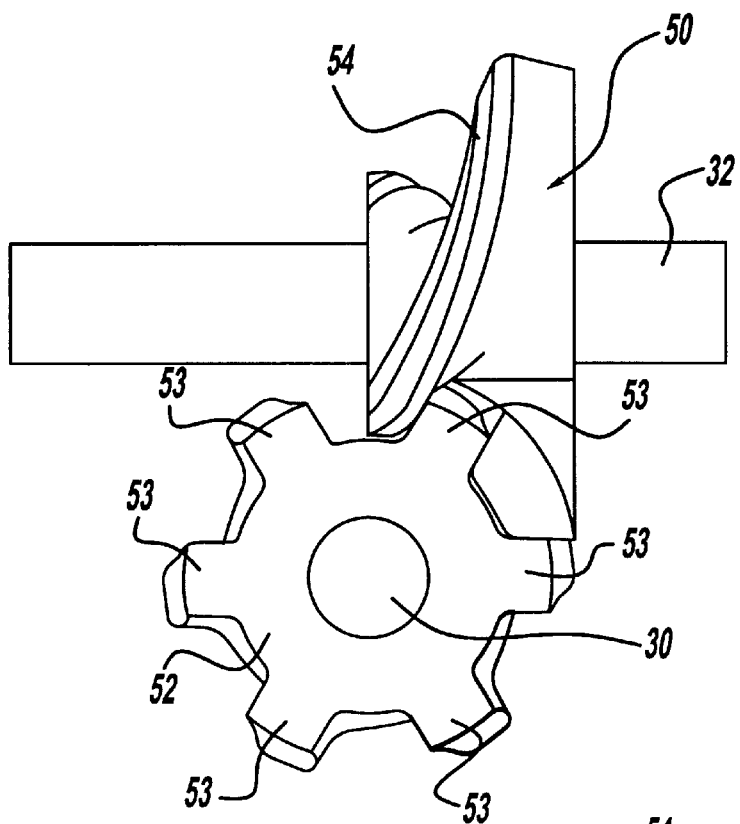
FIGS. 9 and 10 show a worm/worm gear transmission utilizing a modified worm.

FIG. 9 shows a shortened enveloping worm 50 with an enveloping type of worm gear 52, which has a different profile of teeth 53, compared to teeth 28 of worm gear 26 (shown in FIGS. 2 and 7) even for the same number of worm gear teeth. This difference is due to the fact that the profile of teeth 53 was generated by a shortened enveloping thread 54 for shortened enveloping worm 50.

Figure 10:
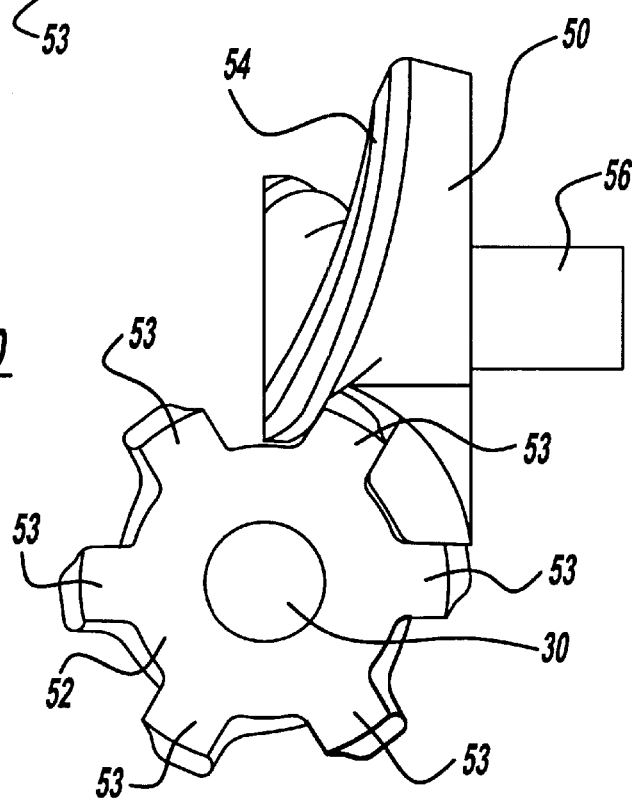
Figure 11:
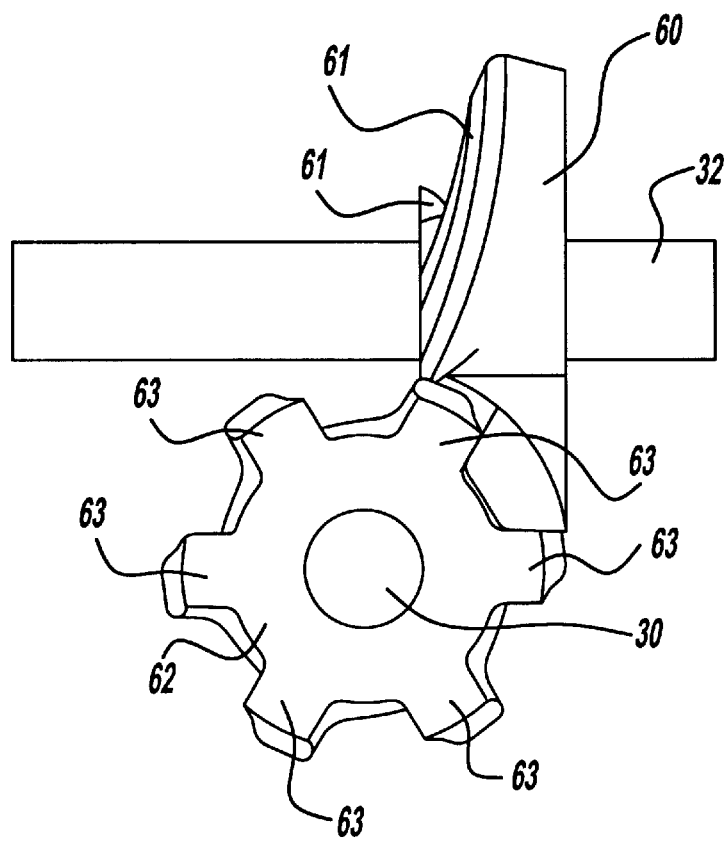
FIG. 11 shows a worm/worm gear transmission with a modified worm in an off-center position.
Figure 12:
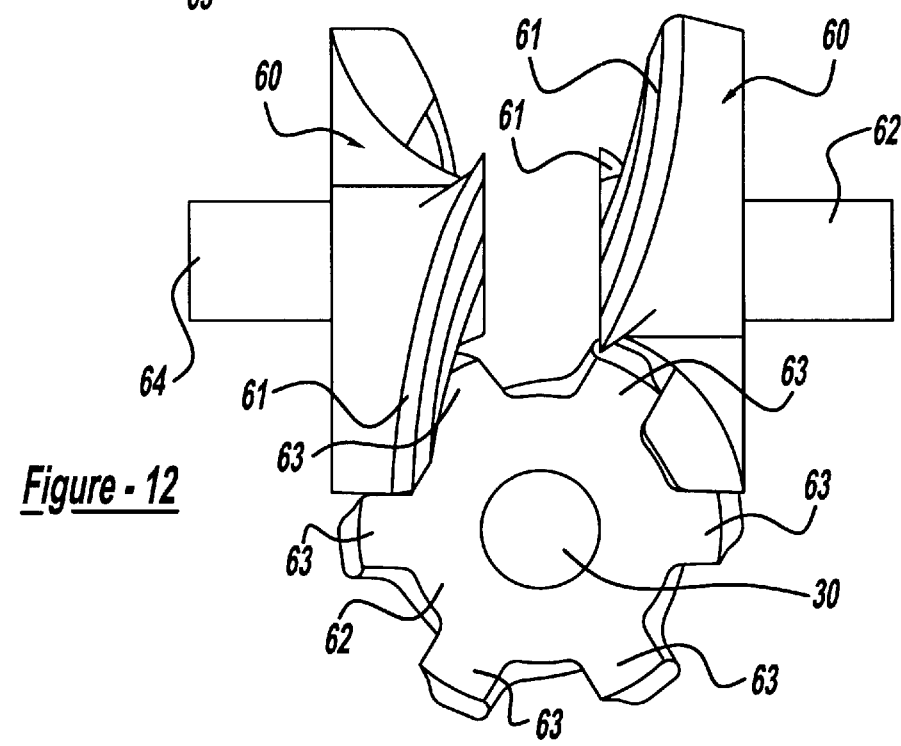
FIG. 12 shows a worm/worm gear transmission with two modified worms in off-center positions.

In FIG. 10, enveloping worm 50 is connected to a drive shaft 56 which supports worm 50 from one side. FIG. 11 shows a view of a worm/worm gear transmission with a modified enveloping split worm 60 having two threads 61 in an off-center position relative to an enveloping-type worm gear 62 having six teeth 63. In contrast, FIG. 12 shows a side view of a worm/worm gear transmission with two modified worms 60 having two threads 61 in off-center positions and respectively connected to different drive shafts 62 and 64 and each meshingly engaged with worm gear 62.

FIG. 13 shows a view of a worm/worm gear transmission with two modified worms 60 in off-center positions placed on the same axis of rotation and both connected to drive shaft 32. When the modified worms are connected to a common shaft with a different angular phase of the threads, it means that in motion, the threads of one worm are entering mesh with the worm gear teeth while the thread of the other worm are released from mesh at different times. The purpose of the phase difference is to increase the contact ratio and to provide smooth mesh.

FIG. 14 shows a view of a worm/worm gear transmission with two modified worms 60 having worm threads 68 each placed on different axes of rotation and connected to different drive shafts 70 and 72. Each of worms 60 meshingly engages the worm gear 62 having teeth 64.

Figures 15, 16:
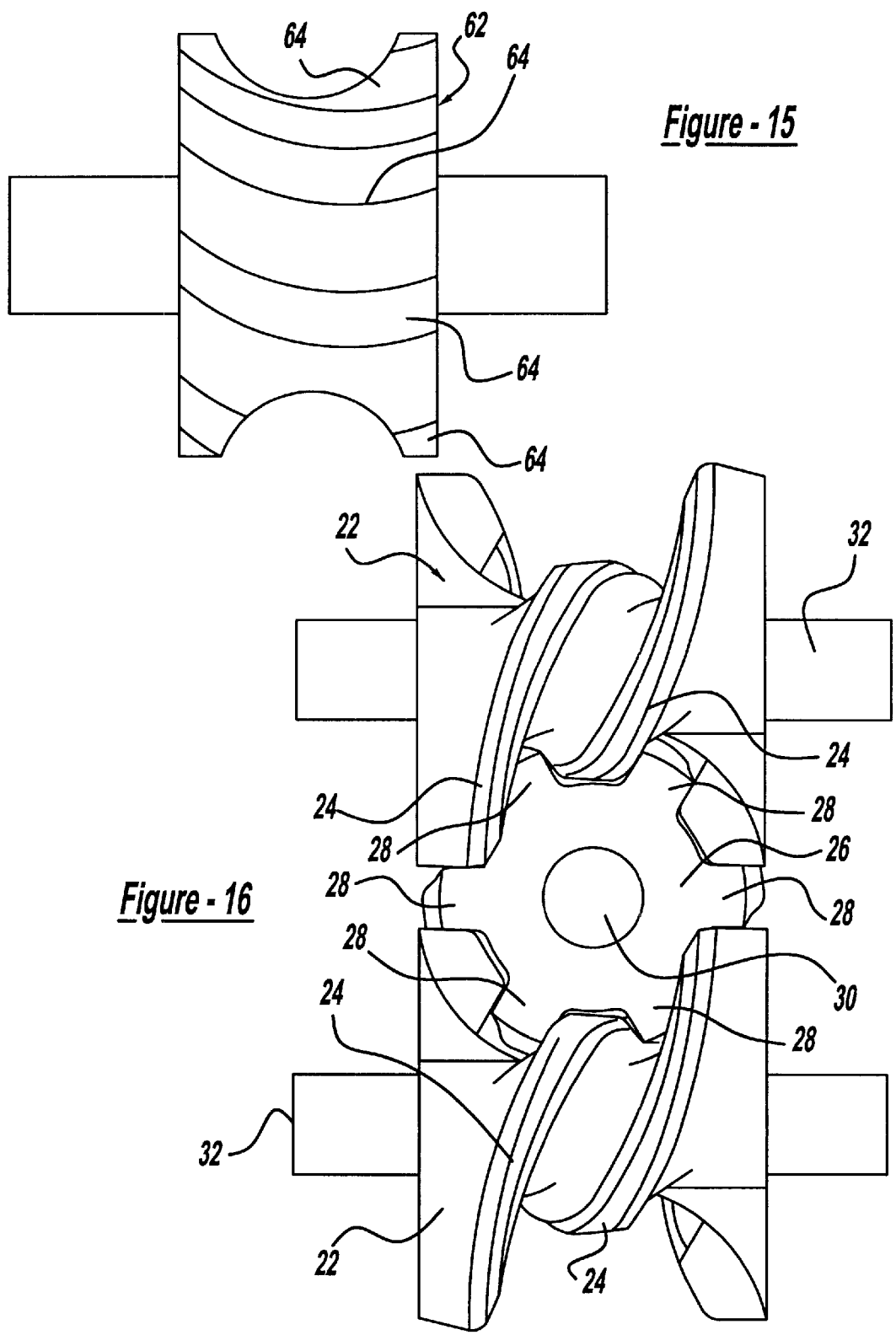
FIG. 15 shows an enveloping worm gear with a different tooth profile.
FIG. 16 shows a worm/worm gear transmission with two enveloping worms placed on different axes of rotation.

FIG. 15 shows a side view of an enveloping worm gear 62 with teeth 64 have a different profile which is generated by enveloping thread 68 of worm 60 as shown in FIG. 14.

FIG. 16 shows a view of a worm/worm gear transmission with two enveloping worms 22 having corresponding worm threads 24 placed on different axes of rotation and which are connected to drive shafts 32 and 23. Each of worms 22 meshingly engages enveloping worm gear 26.

Figure 19:
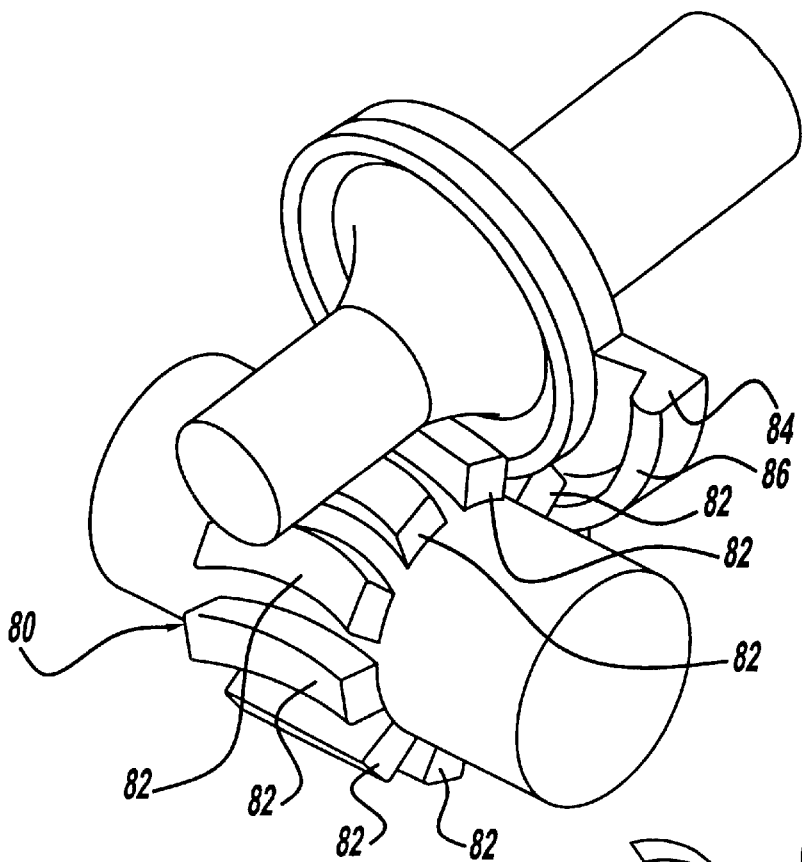
FIG. 19 is a perspective view of a worm/worm gear transmission with ten worm gear teeth and with a single thread worm.

FIG. 19 is a perspective view of a worm/worm gear transmission including worm gear 80 having ten teeth 82 in mesh with an enveloping split worm 84 including a thread 86.

Figure 20:
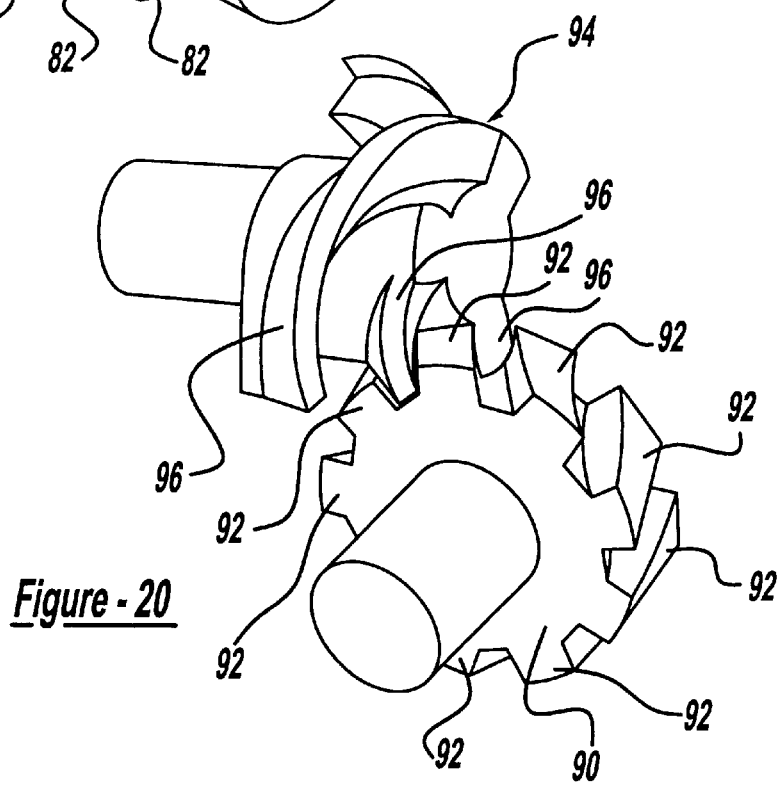
FIG. 20 is a perspective view of a worm/worm gear transmission with nine worm gear teeth and a modified worm having three threads on the worm.

FIG. 20 is a perspective view of a worm gear 90 having nine teeth 92 in mesh with a modified enveloping split worm 94 having three threads 96.

Figure 23:
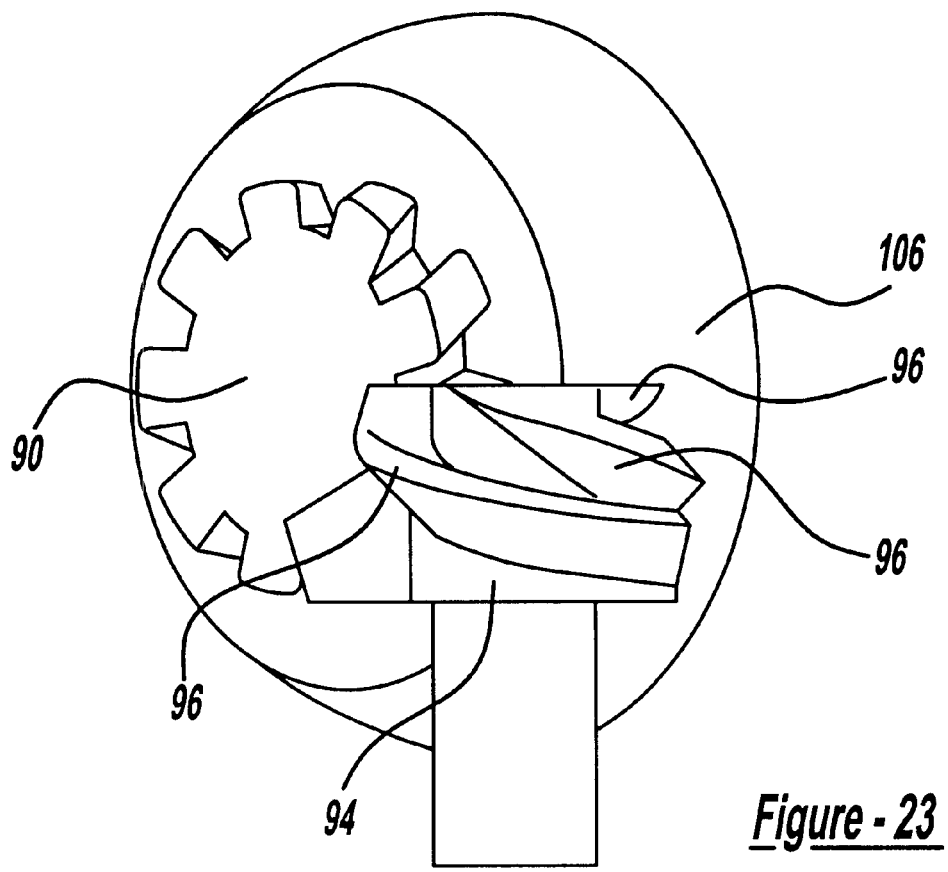
FIG. 23 illustrates the size difference of the worm/worm gear transmission of FIG. 20 in comparison to the size of a typical hypoid gear.

FIG. 23 illustrates the size difference of a worm/worm gear transmission as shown in FIG. 20 in comparison with the size of a typical hypoid gear 106.

For the inventions described in the present patent application, there could be two different types of operations. When the worm/worm gear transmission does not incorporate the self-lock feature, the motion could be provided from the drive shaft through enveloping worm 12 and enveloping-type worm gear 16 to an output shaft or back from the output shaft to the drive shaft 32. The same operation is applicable for motion from the drive shaft to the driven shafts or from the driven shafts to drive shaft of the various other embodiments shown.

Alternatively, when the worm/worm gear transmission does include the self-lock feature, rotary motion can be provided only from the drive shaft to the enveloping worm and through the enveloping type worm gear to the output shaft. Thus, the worm/worm gear transmissions shown in FIGS. 12, 14 and 16, with independent drive shafts connected to the worms, could be used in a split-power transmission, to transmit energy from a high-speed engine to a rotor drive shaft. In the present invention, a self-locking worm/worm gear combination can have a worm gear to worm thread ratio that is preferably ten and less. Such a system is desirable so that each one of the worm and worm gear combinations described above can transmit very high torque loads when compared to prior systems. The lower noise of the worm/worm gear transmission, compared with hypoid and bevel gear transmission, make using the worm/worm gear transmission of the present invention more beneficial, particularly in motor vehicle powertrain applications. For the same size, this invention can provide more than twice the capacity of hypoid gearing, where the hypoid gear also has more than 24 teeth. The smaller number of teeth of the present invention than in a hypoid gear of the same circumference makes each tooth thicker and therefore stronger. In the illustration shown in FIG. 23, a modified worm 94 with three threads 96 is shown which has a shape and size similar to a pinion of a hypoid transmission. Assuming the modified worm 94 is the same size as the pinion of a hypoid gear set, the diameter of hypoid gear 106 is twice the diameter of worm gear 90. Up to now, those skilled in the art were of the opinion that an enveloping type worm gear with less than twenty-four teeth would not work and/or that it presented an insurmountable barrier to commercial applications.

Figure 24:
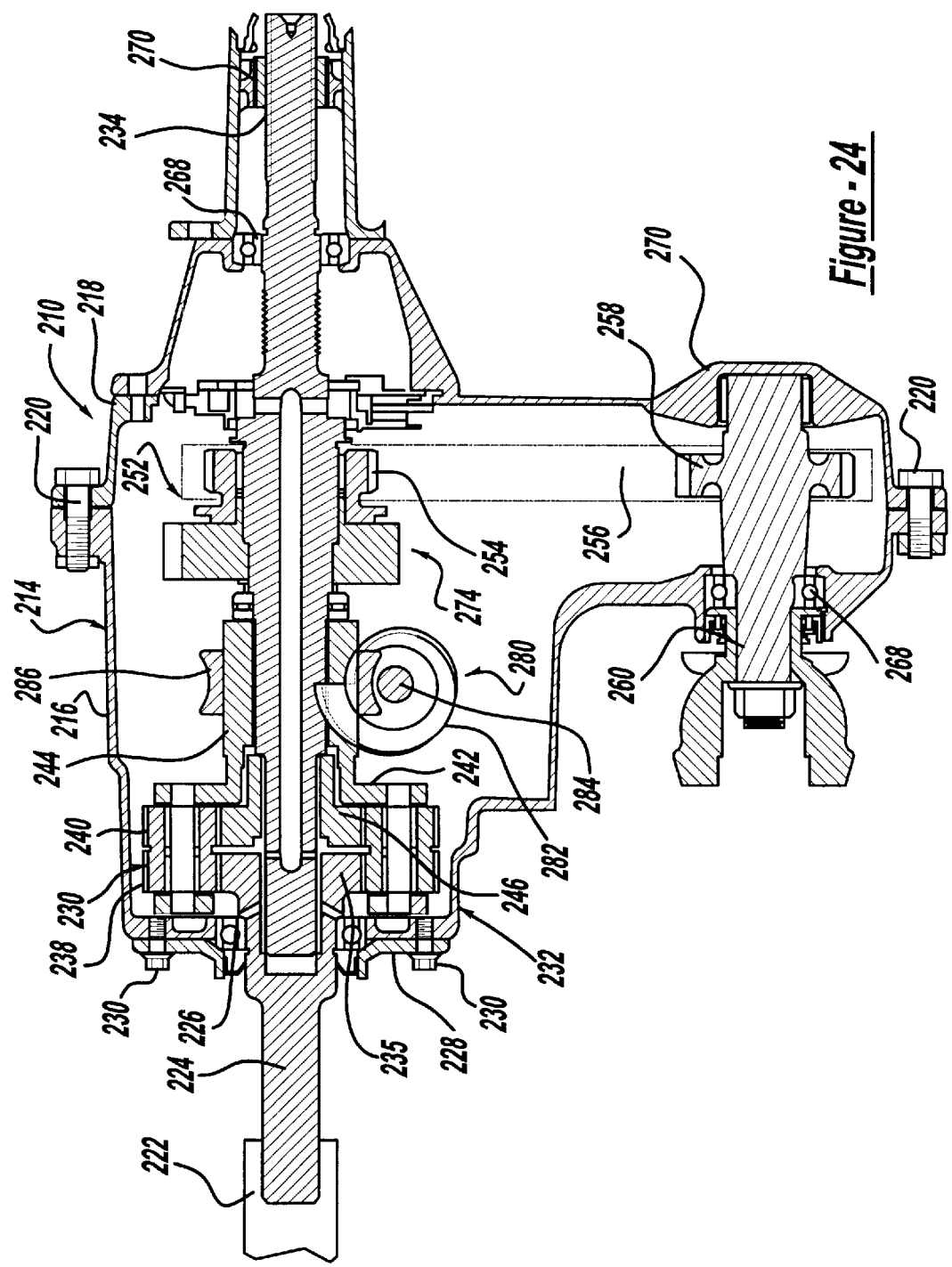
FIG. 24 is a sectional view of a transfer case equipped with a continuously variable range system according to the principles of the present invention.
Figure 25:
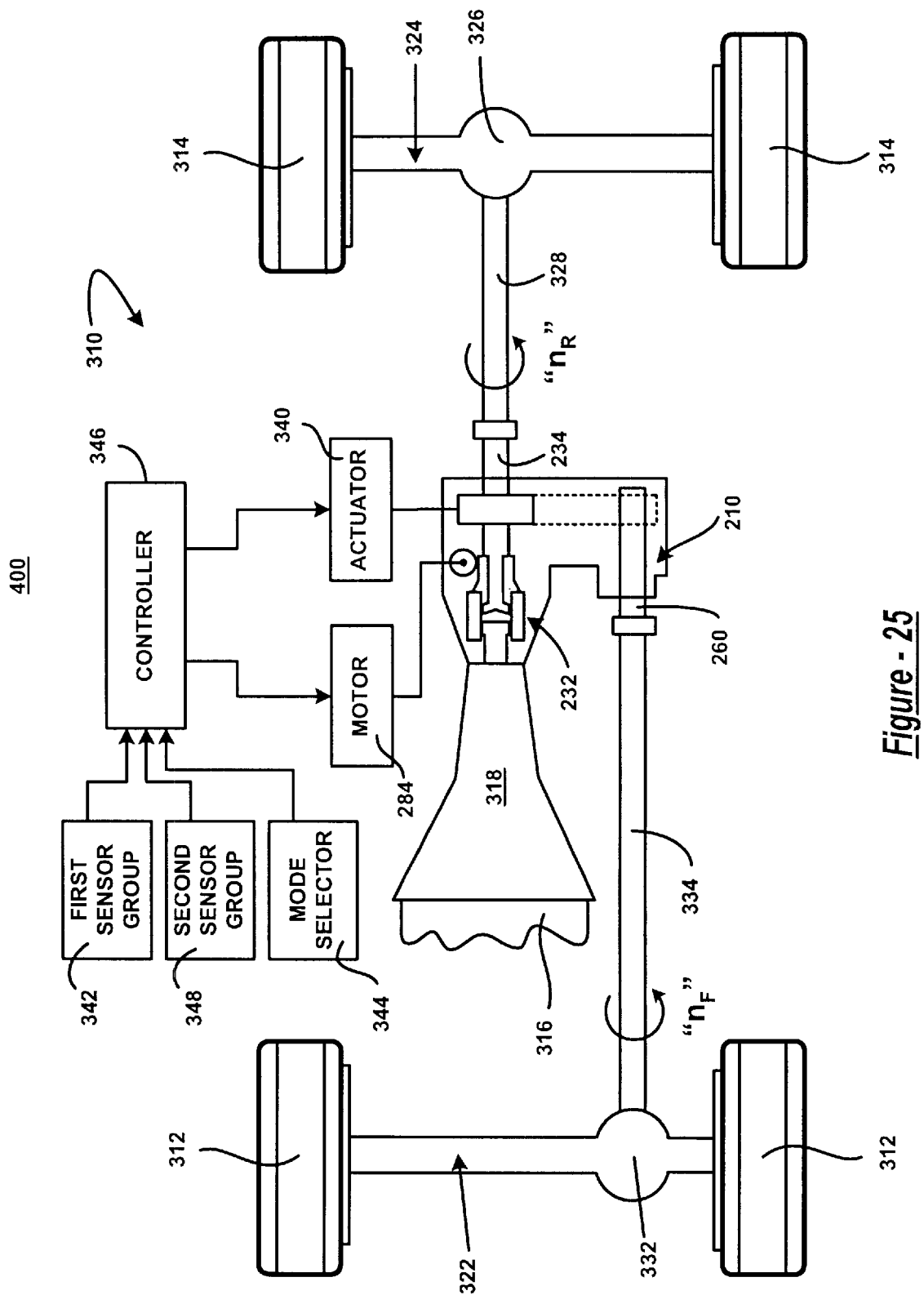
FIG. 25 is a schematic view of four-wheel drive vehicle equipped with the transfer case of the present invention.

With reference now to FIGS. 24 and 25, there is shown an exemplary transfer case 210 of the type adapted for use in four-wheel drive motor vehicles. Transfer case 210 includes a housing assembly 214 including front and rear housing sections 216 and 218, respectively, which are suitably interconnected by a plurality of threaded bolts 220. An internally-splined transmission output shaft 222 is connected with an externally-splined input shaft 224 such that transmission output shaft 222 and input shaft 224 are rotatably driven by an engine 316 of the motor vehicle. Input shaft 224 is shown mounted for rotation in front housing section 216 by a suitable bearing assembly 226. A removable collar 228 is secured by a plurality of bolts 230 to front housing sections 216 for retaining bearing assembly 226 therein.

As known, transfer case 210 is operable for transferring power (i.e., drive torque) from engine 316 (shown in FIG. 25) to the vehicle's front wheels 312 and rear wheels 314. Transfer case 210 is shown to include a planetary gear reduction assembly 232 that is operably installed between input shaft 224 and an output member 234. In the arrangement shown, the output member is a rear output shaft 234. Planetary gear assembly 232 includes a first sun gear 235 mounted to input shaft 224 and which is surrounded by a plurality of compound planet gears 236 having a first gear portion 238 meshingly engaged with first sun gear 238. Compound planet gears 236 are rotatably supported by a carrier 242 having a longitudinally extending annular sleeve drive member 244. Each compound planet gears 236 also has a second gear portion 240 which is meshingly engaged with a second sun gear 246 splined to rear output shaft 234. Sleeve member 244 is shown to be journally supported on rear output shaft 234. As will be described hereinafter, the present invention is directed to a range system which permits planetary gear assembly 232 to be selectively shifted between two distinct ranges (high-range and low-range) or to be continuously varied therebetween. This unique range control can be utilized while the motor vehicle is operating in either two or four-wheeled drive operating modes.

As best seen from FIG. 24, rear output shaft 234 is aligned on the longitudinal axis of input shaft 224 and has a first end piloted in an axial bore of input shaft 224. As is known, the opposite end of rear output shaft 234 is adapted for connection to a rear drive shaft 328 of the motor vehicle for delivering drive torque to a rear axle assembly 324 and, in turn, to the rear set of ground-engaged wheels 314. A transfer assembly 252 is shown rotatably journalled on rear output shaft 234 and includes a drive sprocket 254 drivingly engaging a chain 256, and which, in turn, is coupled to a lower driven sprocket 258. Driven sprocket 258 is fixed to a second output member which is shown as a front output shaft 260. Front output shaft 260 is mounted for rotation within housing assembly 214 by suitable bearing assemblies 268 and 270. Front output shaft is connected to the motor vehicle's front drive shaft 334 for driving a front axle assembly 322 and, in turn, the front set of ground-engaging wheels 312.

Since transfer case 210 functions to selectively and/or automatically transfer drive torque to front output shaft 260, a torque transfer coupling 274 is provided for shifting transfer case 210 between a two-wheel drive (2WD) mode and a four-wheel drive (4WD) mode. Torque transfer coupling 274 is shown in a block format to illustrate applicability of any type of clutching device capable of causing torque to be transferred from rear output shaft 234 to front output shaft 260. Torque transfer coupling 274 may include a conventional synchronized clutch for permitting the vehicle operator to shift transfer case 210 "on-the-move" between 2WD and 4WD drive modes. One example of a synchronized clutch mode shift mechanism is shown and described in U.S. Pat. No. 5,076,112. Other known torque transfer couplings 274 may also be utilized. For example, a passive torque transfer coupling, such as a viscous coupling or a pump-type speed differential coupling, as disclosed in commonly assigned U.S. Pat. Nos. 5,597,369 and 5,704,863, may be utilized. In addition, "active" torque transfer couplings for providing on-demand four-wheel drive, as is well known from commonly assigned U.S. Pat. No. 5,704,867, can be used. Alternatively, for a full-time all-wheel drive type system, other known manually or automatically operated mechanical locking mechanisms can be utilized for transferring torque through a differential to both rear output shaft 234 and front output shaft 260, such as is known from commonly assigned U.S. Pat. No. 5,711,740.

In accordance with the principles of the present invention, an electrically-controlled rotary drive mechanism 280 is provided in conjunction with planetary gear assembly 232 to permit continuous range ratio variation without the need to stop the vehicle (i.e. "on-the-move"). It is to be understood that, while shown in conjunction with a particular four-wheel drive transfer case 210, drive mechanism 280 is adapted for virtually any transfer case having any type of gear reduction unit incorporated therein. According to a preferred embodiment of the present invention, drive mechanism 280 includes a worm 282 which is driven by an electric motor 284. Worm 282 is meshingly engaged with a worm gear 286 which, in turn, is coupled to a longitudinally extending sleeve portion 244 of carrier 242 of planetary geartrain 232. As such, rotation of worm gear 286 causes carrier 242 to rotate. Worm 282 and worm gear 286 are of the double enveloping-type described above and the ratio of the number of teeth on the worm gear to the number of threads on the worm is low. Preferably, enveloping worm gear 286 has fewer than twenty-four teeth, as described in detail with reference to FIGS. 1 through 23.

When it is desired to change the torque transfer ratio between input shaft 224 and rear output shaft 234, drive mechanism 280 is actuated. Specifically, actuation of motor 284 causes enveloping worm 282 to be rotated for driving enveloping worm gear 286 which, in turn, rotates carrier member 242 of planetary gear assembly 232. By varying the relative rotational velocity of carrier member 242 with respect to input shaft 224, the resulting rotational velocity of rear output shaft 234, and the torque ratio delivered thereto, can be modified relative to the rotational velocity of input shaft 224. This variable control is provided by motor 284 being of the variable speed type.

Referring to FIG. 25 of the drawings, a drivetrain for a four-wheel drive vehicle 400 is schematically shown interactively associated with a power transfer control system 310 which incorporates the novel principles of the present invention. The motor vehicle drivetrain has a pair of front wheels 312 and rear wheels 314 both drivable from a source of power, such as an engine 316, through a transmission 318 which may be of either the manual or automatic type. In the particular embodiment shown, the drivetrain is a rear wheel drive system such that transfer case 210 receives drive torque from engine 316 and transmission 318 for normally driving rear wheels 314 (i.e., the "driven" wheels) in the two-wheel drive mode of operation. However, it is to be understood that the specific orientation of the drivetrain is merely exemplary in nature and that the drivetrain could be reversed for normally driving front wheels 312 in the two-wheel drive mode.

Front wheels 312 and rear wheels 314 are shown connected at the opposite ends of front and rear assemblies 322 and 324, respectively. As is know, a rear differential 326 is interconnected between rear axle assembly 324 and one end of rear drive shaft 328, the opposite end of which is interconnected to rear output shaft 234 of transfer case 210. Similarly, front axle assembly 322 includes a front differential 332 that is coupled to one end of front drive shaft 334, the opposite end of which is coupled to front output shaft 260 of transfer case 210.

According to a preferred embodiment of power transfer control system 310, the torque transfer arrangement includes an electronically-controlled torque transfer coupling 274 that is operable for transferring drive torque "on-demand" from rear output shaft 234 to front output shaft 260. To this end, power transfer system 310 further comprises a power-operated actuator 340 for actuating torque transfer coupling 274, a first group of sensors 342 for sensing specific dynamic and operational characteristics of the motor vehicle and generating sensor input signals indicative thereof, a mode selector 344 for permitting the vehicle operator to select one of several available drive modes and generate a mode signal indicative thereof, and a controller 346 for generating a control signal in response to the sensor input signals and the mode signal. Preferably, first sensor group 342 includes sensors for detecting the rotary speed of input shaft 224 and output shafts 234 and 260. Controller 346 is capable of controlling actuation of motor 284 of drive mechanism 280 for controlling the torque applied to rear output shafts 234 through planetary gearset 232. In a preferred embodiment, the worm/worm gear transmission associated with drive mechanism 280 is self-locking so that no additional lockout mechanism is required. However, if a non-self-locking worm/worm gear transmission is utilized, a separate clutch type lockout mechanism can be utilized and controlled by controller 346 to prevent rotation of carrier 242 when desired.

In the active control system disclosed, controller 346 is operable for controlling the amount of drive torque transfer through torque transfer coupling 274 to front output shaft 260 by sending the control signal to actuator 340. When the two-wheel drive mode is selected, all drive torque is delivered from rear output shaft 234 to rear wheels 314 and torque transfer coupling 274 is maintained in a "non-actuated" condition. When a part-time four-wheel drive mode is selected, torque transfer coupling 274 is fully actuated into a "lock-up" condition such front output shaft 260 is, in effect, rigidly coupled for driven rotation with rear output shaft 234. When the "on-demand" four-wheel drive mode is selected, controller 346 adaptively controls actuator 320 to regulate the amount of drive torque transferred through coupling 274 to front output shaft 260.

In addition to the manual/automatic "mode" control feature, power transfer control system 310 also permits manual/automatic "range" control. Specifically, mode selector 344 permits the vehicle operator to shift between operation in a "manual" mode and an "automatic" mode. In the manual mode, if a high-range drive connection is selected, motor 284 is turned off and worm 282 is not rotated. Since the worm/worm gear transmission is self-locking, carrier 242 is likewise held stationary such that a direct connection is established between input shaft 224 and output shaft 234. Alternatively, if a particular low-range drive connection (i.e. 2.7 to 1.0) is selected, motor 284 is actuated to rotate carrier 242 for maintaining a specific speed differential with respect to input shaft 224. Finally, if the Automatic variable range is selected, then the speed differential between carrier 242 and input shaft 224 can be continuously varied by varying the rotary speed of worm 282. Such control of motor 284 enables controller 346 to instantaneously vary the amount of drive torque directed through planetary gear reduction unit 232 to both output shafts as a function of the sensor input signals for providing enhanced tractive performance. If desired, the actuated condition of motor 284 can be modulated in the two-wheel drive mode to provide on-demand tractive to only the rear wheels.

Power transfer system 310 can additionally include a second group of sensors 348 for generating "operated-initiated" input signals that are indicative of the position of one or more movable control elements (i.e., brake pedal, throttle, position, steering angle, etc.) under the control of the vehicle operator. The operator-initiated input signals are used for establishing control characteristics which, in conjunction with the sensor input signals, further regulate the torque distribution and level during "on-demand" operation. Drive mechanism 280 of transfer case 210 is responsive directly to the input from the operator initiated sensor 348 or through instructions buffered by controller 346 for selectively transferring drive torque from engine 316 and transmission 318 to rear output shaft 234 either directly (i.e., "high-range") or at some reduced-ratio (i.e., "lower-range"). Preferably, controller 346 is operable for modifying the output of drive mechanism 280, between its various speed ranges and actuating actuator 340 in response to the mode signal generated by mode selector 344.

Thus, control of drive mechanism 280 can be transparent to the vehicle operator with no manual shifting between distinct high and low ranges required. The additional benefit of continuously variable adjustment of the ratio established across drive mechanism 280 is that there is no need to stop the vehicle to range shift, since control is automatic and smooth based on the particular vehicle operating conditions detected by sensors 342 and 348. However, mode selector 344 can also be manipulated by the vehicle operator to select one of the available speed ratios and drive modes. Specifically, one or more low-range ratios (for example ratios of 2.7 to 1.0 and 4.0 to 1.0) can be made available, in addition to a direct high-range (1.0 to 1.0 ratio), by controlling drive mechanism 280. The particular range signal indicative of the selection requested is sent to controller 346 for use in controlling actuator of drive mechanism 280.

Figure 26:
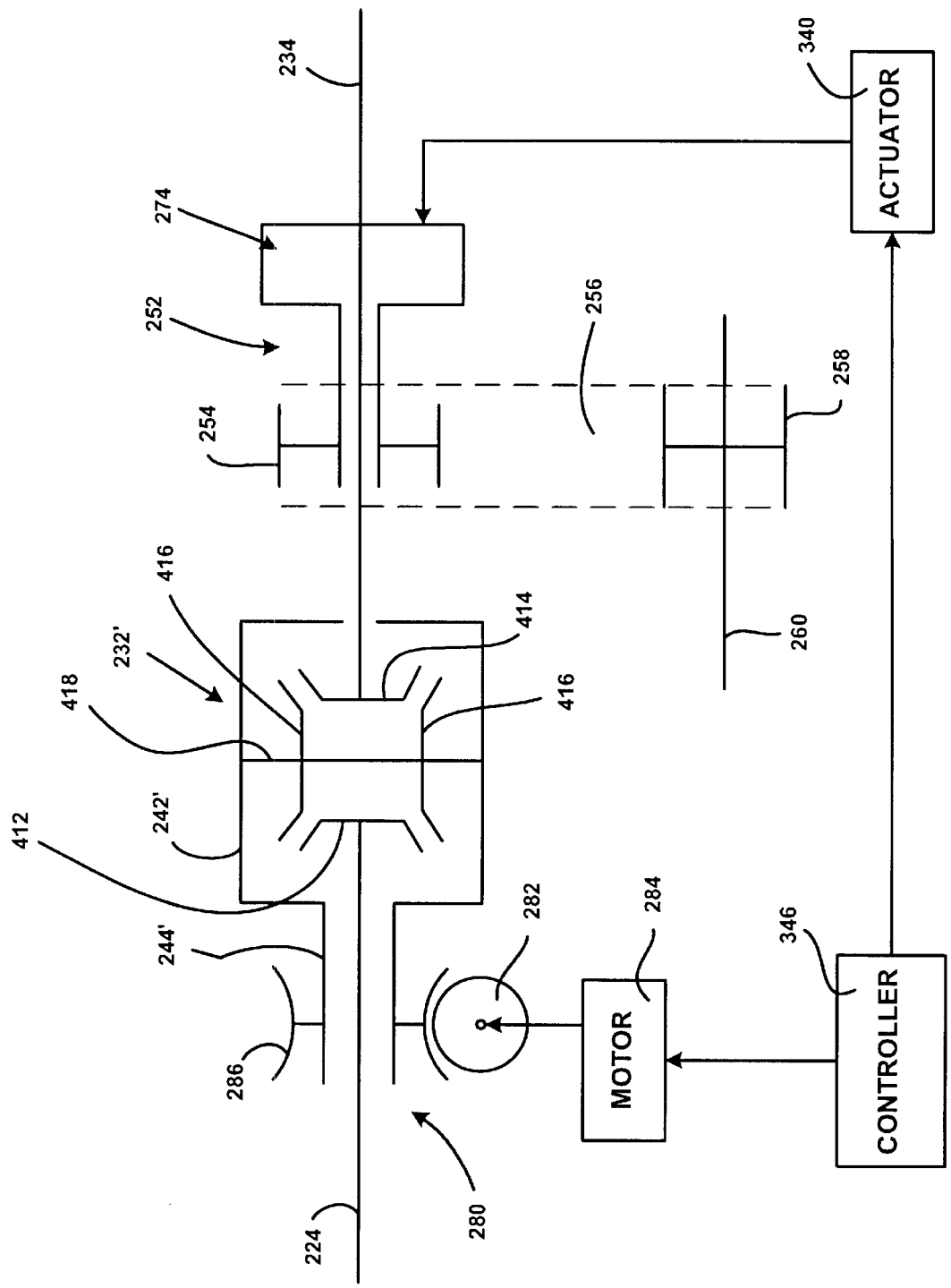
FIG. 26 is a schematic illustration of an alternative embodiment of a transfer case according to the present invention.

Referring to FIG. 26, an alternative arrangement for a transfer case 410 equipped with a continuously variable range assembly is shown to include rotary drive mechanism 280 and a bevel-type gear reduction assembly 232'. Bevel gearset 232' includes a first side gear 412 fixed to input shaft 224, a second side gear 414 fixed to rear output shaft 234, and pinion gears 416 rotatably supported on a pinion shaft 418 which is fixed to carrier 242'. As seen, worm gear 286 of drive mechanism 280 is fixed to a sleeve segment 244' of carrier 242'. As also shown, several components similar to those associated with transfer case 210 are identified by common reference numerals. When it is desired to change the torque ratio between input shaft 224 and rear output shaft 234, motor 282 is again controlled by controller 346 to controllably vary the relative rotation between input shaft 224 and carrier 242'. In a manner similar to that described for transfer case 210, distinct high and low-range speed ratios can be established as well as an adaptive continuously variable speed ratio.

Several embodiments of the present invention have been disclosed. A worker of ordinary skill in the art would recognize that certain modifications would come within the scope of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transfer case comprising:

an input shaft;

an output shaft;

a gear reduction unit having a first component driven by said input shaft;

a second component driving said output shaft, and a rotatable third component;

a worm gearset having a worm gear fixed to said third component of said gear reduction unit, and a worm meshed with said worm gear; and a variable speed motor for driving said worm so as to control the rotary speed of said third component relative to said input shaft for varying the speed ratio between said input shaft and said output shaft.

2. A transfer case comprising:

an input shaft;

an output shaft;

a gear reduction unit having a first component driven by said input shaft;

a second component driving said output shaft, and a rotatable third component;

a worm gearset having a worm gear fixed to said third component of said gear reduction unit, and a worm meshed with said worm gear; and a variable speed motor for driving said worm so as to control the rotary speed of said third component relative to said input shaft for varying the speed ratio between said input shaft and said output shaft;

wherein said gear reduction unit includes a sun gear fixed to said input shaft, a carrier to which said worm gear is fixed, and planet gears meshed with said sun gear and which drive said output shaft, wherein a direct drive ratio is established between said input shaft and said output shaft when said worm gearset is held against rotation, and wherein a continuously variable reduction drive ratio is established between said input shaft and said output shaft when said motor is actuated to rotate said worm gear for varying the relative speed between said input shaft and said carrier.

3. The transfer case of claim 2 wherein said gear reduction unit further includes a second sun gear fixed to said output shaft and which is meshed with said planet gears.

4. The transfer case of claim 2 wherein said worm gearset is self-locking such that said carrier is held against rotation until said worm gearset is rotatably driven by said motor.

5. The transfer case of claim 1 wherein said worm gear is an enveloping worm gear having less than twenty-four teeth.

6. The transfer case of claim 1 further comprising:

sensors for sensing operational characteristic of a motor vehicle in which said transfer case is installed; and a controller for controlling variable speed actuation of said motor in response to input signals from said sensors.

7. The transfer case of claim 6 further comprising a mode selector for permitting a vehicle operator to select operation in either of a Manual range mode and an Automatic range mode, wherein said Manual mode permits the vehicle operator to select between a high-range mode and a low-range mode, and in said Automatic mode said controller provides variable speed actuation of said motor without input from vehicle operator.

8. The transfer case of claim 1 wherein said gear reduction unit is a bevel differential, the first component comprising a first side gear fixed to said input shaft, the second component comprising a second side gear fixed to said output shaft, the third component comprising a carrier, which supports pinion gears meshed with said side gears and wherein said worm gear is fixed for rotation with said carrier.

9. The transfer case of claim 1 further comprising:

a second output shaft; and a transfer assembly for transferring drive torque from said first output shaft to said second output shaft.

10. A transfer case for a four-wheel drive vehicle having a power source and front and rear drivelines comprising:

an input shaft adapted to receive rotary power from the power source;

a rear output shaft adapted to drive the rear driveline;

a front output shaft adapted to drive the front output driveline;

a transfer assembly for transferring rotary power from said rear output shaft to said front output shaft;

a planetary gearset having a first sun gear driven by said input shaft, a second sun gear driving said rear output shaft, planet gears meshed with said first and second sun gears, and a carrier rotatably supporting said planet gears;

a worm gearset having a worm gear fixed to said carrier and a worm meshed with said worm gear;

a motor having a rotary output member fixed to said worm; and a control system for controlling variable speed actuation of said motor which acts to vary the relative rotary speed between said input shaft and said carrier.

11. The transfer case of claim 10 wherein said planet gears each have a first gear segment meshed with said first sun gear and a second gear segment meshed with said second sun gear.

12. The transfer case of claim 10 wherein said transfer assembly includes a torque transfer coupling operable for automatically transferring drive torque from said rear output shaft to said front output shaft to establish an on-demand four-wheel drive mode.

13. The transfer case of claim 12 wherein said coupling includes an actuator controlled by said control system.

14. The transfer case of claim 10 wherein said worm gearset is self-locking such that said carrier is held against rotation until said worm gearset is rotatably driven by said motor.

15. The transfer case of claim 10 wherein said worm gear is an enveloping worm gear having less than twenty four teeth.

16. The transfer case of claim 10 wherein said control system includes:

sensors for sensing operational characteristics of the vehicle and a controller for controlling variable speed actuation of said motor in response to input signals from said sensors.

17. A transfer case for a four-wheel drive vehicle having a power source and front and rear drivelines comprising:

an input shaft adapted to receive rotary power from the power source;

a rear output shaft adapted to drive the rear driveline;

a front output shaft adapted to drive the front output shaft;

a transfer assembly for transferring rotary power from said rear output shaft to said front output shaft;

a bevel gearset having a first side gear driven by said input shaft, a second side gear driving said rear output shaft, pinion gears meshed with said first and second side gears, and a carrier rotatably supporting said pinion gears;

a worm gearset having a worm gear fixed to said carrier and a worm meshed with said worm gear;

a motor having a rotary output member fixed to said worm; and a control system for controlling variable speed actuation of said motor which acts to vary the rotary speed differential between said input shaft and said carrier.

18. The transfer case of claim 17 wherein said transfer assembly includes a torque transfer coupling operable for automatically transferring drive torque from said rear output shaft to said front output shaft to establish an on-demand four-wheel drive mode.

19. The transfer case of claim 18 wherein said coupling includes an actuator controlled by said control system.

20. The transfer case of claim 17 wherein said worm gearset is self-locking such that said carrier is held against rotation until said worm gearset is rotatably driven by said motor.

21. The transfer case of claim 17 wherein said worm gear is an enveloping worm gear having less than twenty four teeth.

22. The transfer case of claim 17 wherein said control system includes:

sensors for sensing operational characteristics of the vehicle; and a controller for controlling variable speed actuation of said motor in response to input signals from said sensors.

\* \* \* \* \*